(12) United States Patent
Meyer et al.

(10) Patent No.: US 11,433,374 B2
(45) Date of Patent: Sep. 6, 2022

(54) SORBENT FOR BINDING METALS AND PRODUCTION THEREOF

(71) Applicant: instrAction GmbH, Mannheim (DE)

(72) Inventors: Christian Meyer, Schwetzingen (DE); Martin Welter, Heidelberg (DE); Thomas Schwarz, Cologne (DE)

(73) Assignee: instrAction GmbH, Mannheim (DE)

( * ) Notice: Subject to any disclaimer, the term of this patent is extended or adjusted under 35 U.S.C. 154(b) by 0 days.

(21) Appl. No.: 16/735,072

(22) Filed: Jan. 6, 2020

(65) Prior Publication Data
US 2020/0171463 A1 Jun. 4, 2020

Related U.S. Application Data

(63) Continuation of application No. 15/507,100, filed as application No. PCT/EP2015/001754 on Aug. 28, 2015, now abandoned.

(30) Foreign Application Priority Data

Aug. 29, 2014 (DE) ...................... 10 2014 012 566.1

(51) Int. Cl.
*B01J 20/32* (2006.01)
*C02F 1/28* (2006.01)
*B01J 20/34* (2006.01)
*C02F 101/20* (2006.01)

(52) U.S. Cl.
CPC ......... *B01J 20/3282* (2013.01); *B01J 20/321* (2013.01); *B01J 20/3204* (2013.01); *B01J 20/3225* (2013.01); *B01J 20/3274* (2013.01); *B01J 20/3293* (2013.01); *B01J 20/345* (2013.01); *B01J 20/3425* (2013.01); *B01J 20/3475* (2013.01); *C02F 1/288* (2013.01); *C02F 1/285* (2013.01); *C02F 2101/20* (2013.01)

(58) Field of Classification Search
CPC ................ B01J 20/3282; B01J 20/3425; B01J 20/3475; B01J 20/3204; B01J 20/3293; B01J 20/3274; B01J 20/3225; B01J 20/321; B01J 20/345; C02F 1/288; C02F 2101/20; C02F 1/285
USPC ........................................................ 502/401
See application file for complete search history.

(56) References Cited

U.S. PATENT DOCUMENTS

| | | | |
|---|---|---|---|
| 2013/0095996 A1* | 4/2013 | Buelow | ................ B01J 20/3272 502/62 |
| 2013/0213229 A1 | 8/2013 | Shahin et al. | |
| 2013/0294991 A1 | 11/2013 | Jones et al. | |

FOREIGN PATENT DOCUMENTS

WO 2011012302 A1 2/2011

OTHER PUBLICATIONS

Uludag et al. "Removal or mercury from aqueous solutions via polymer-ennanced ultrafiltration" Journal ot Membrane Science vol. 129, Issue 1, Jun. 25, 1997, pp. 93-99. (Year: 1998).*

Teyssié et al. "Structure and properties of polymeric chelates. IV. Structure and shape of polyvinylamine chelates in aqueous solution" Macromolecular Chemistry and Physics, vol. 84, Issue1, Apr. 26, 1965, pp. 51-63 (Year: 1965).*

(Continued)

*Primary Examiner* — Colin W. Slifka
(74) *Attorney, Agent, or Firm* — RatnerPrestia (57) ABSTRACT

The present invention relates to a sorbent which is suitable for binding metals from solutions, the production of a corresponding sorbent as well as the use of the sorbent for binding metals from solutions.

14 Claims, 8 Drawing Sheets

(56) References Cited

OTHER PUBLICATIONS

Chanda et al., "Polyethyleneimine gel-coat on silica. High Uranium Capacity and Fast Kinetics of Gel-Coated Resin", Reactive Polymers, 1995, vol. 25, pp. 25-36.
International Search Report and Written Opinion of the International Searching Authority for International Application No. PCT/EP2015/001754, 10 pages.
Sigma-Aldrich (26658-46-8) Poly(ethyleneimine), mw-50,000 Product Specification (Year: 2013).
Sigma-Aldrich (482595) Poly(ethyleneimine) solution Product Specification (Year: 2013).
Entire patent prosecution history of U.S. Appl. No. 15/507,100, filed Feb. 27, 2017, entitled, "Sorbent for Binding Metals and Production Thereof."

\* cited by examiner

SORBENT FOR BINDING METALS AND PRODUCTION THEREOF

CROSS-REFERENCE TO RELATED APPLICATIONS

This application is a Continuation Application of U.S. application Ser. No. 15/507,100 (abandoned), filed 27 Feb. 2017, which is the National Stage filing of International Application No. PCT/EP2015/001754, filed 28 Aug. 2015, and claims priority to German Application No. 10 2014 012 566.1, filed 29 Aug. 2014, the entirety of which applications are incorporated herein by reference for all purposes.

The present invention relates to a sorbent which is suitable for binding metals from solutions, the production of a corresponding sorbent as well as the use of the sorbent for binding metals from solutions.

The removal or extraction or recovery of metals, in particular heavy metals, from industrial waste waters, for example at plating plants, from catalyst residues from the petrochemical or pharmaceutical industry, from pit water for example from mines, the renaturation of heavy metal-polluted soils etc. is an increasingly important problem since heavy metals in particular either have a harmful effect on the environment and also their recovery is of economic interest. In other words, on the one hand environmental aspects are the priority, and on the other, the provision of valuable metals, the availability of which is becoming increasingly doubtful or the price of which is rising is also of great interest. A further important field of use of sorbents for the removal or extraction or recovery of metals or heavy metals is the removal of these in drinking water purification and also in seawater desalination. Likewise, the removal of heavy metals from concentrated salt solutions, such as are used in chloralkali electrolysis or similar processes, is also of great interest.

For the said areas of use, previously known phases/sorbents often do not have adequate binding capacity for binding the metals to be bound on a sufficient scale for example from high concentration or low concentration solutions or strongly acidic solutions, in particular also in the presence of alkali or alkaline earth metal ions. Furthermore, previously known phases often do not exhibit stability over the whole range from pH 0 to pH 14. A further disadvantage of many previously known phases is that the desired metal can indeed be bound, but cannot be recovered simply or indeed at all from the sorbent used. Owing to the mostly unsatisfactory binding capacity of known sorbents/phases, a high sorbent/phase volume is often required, as a result of which the metal binding processes are very elaborate and cost-inefficient. Further, owing to the mostly low binding capacity of known metal-binding sorbents, repeated operation of the process is necessary in order for example to be able to provide heavy metal-free water as drinking water.

It was therefore the object of the present invention to provide a novel sorbent which partly or wholly does not exhibit the aforesaid disadvantages. In particular, it is an object of the present invention to provide a sorbent with a high binding capacity towards metals, in particular heavy metals and noble metals, per gram or per millilitre. Preferably, the sorbent provided according to the invention is in particular renewable with sodium hydroxide, or allows the recovery of the metals in a simple manner. A further object of the present invention is to provide a sorbent which still has a relatively high binding capacity towards metals even under acidic conditions.

Furthermore, compared to the metal binding-sorbents known from the state of the art, the volume of the sorbent used for the metal binding should be reduced.

BRIEF DESCRIPTION OF THE DRAWINGS

FIGS. 1 and 2.

FIG. 3.

FIG. 4.

FIGS. 5 and 6.

FIG. 7.

FIG. 8.

DETAILED DESCRIPTION OF EMBODIMENTS OF THE INVENTION

In one embodiment of the present invention, a sorbent comprises a porous support material coated with an amino group-containing polymer, wherein the concentration of the amino groups of the sorbent determined by titration is at least 600 µmol/mL, based on the total volume of the sorbent.

In a further embodiment of the present invention it is preferred that the concentration of the amino groups of the sorbent determined by titration is at least 800 µmol/mL, more preferably at least 1000 µmol/mL, still more preferably at least 1200 µmol/mL and most preferably at least 1500 µmol/mL sorbent. The upper limit of the concentration of the amino groups of the sorbent according to the invention determined by titration is limited by the spatial feasibility or the maximum possible density of the arrangement of the amino groups in the amino group-containing polymer and is at most about 4000 µmol/mL, more preferably 3000 µmol/mL and most preferably about 2500 µmol/mL. The concentration of the amino groups of the sorbent determined by titration is understood to mean the concentration which is obtained according to the analytical method stated in the examples section of this application by breakthrough measurement with 4-toluenesulphonic acid.

Furthermore, it is preferred that the sorbent according to the invention has a ratio of the mass of the amino group-containing polymer to the total volume of the pores of the porous support material of greater than or equal to 0.1 g/mL, more preferably greater than or equal to 0.125 g/mL, still more preferably of greater than or equal to 0.15 g/mL and most preferably greater than or equal to 0.20 g/mL. Here too, physical limits are set to the upper limit of the said ratio, however preferably about at most 0.5 g/mL, more preferably at most 0.4 g/mL and most preferably at most 0.3 g/mL.

The mass of the amino group-containing polymer can be determined by the increase in the tamped density compared to the support material according to DIN 53194. The total volume of the pores [V] of the porous support material can be determined by the solvent absorption capacity (WAC) of the porous support material. The pore volume [vol. %] can also be determined likewise. Here, in each case, this is the volume of the freely accessible pores of the support material, since only this can be determined via the solvent absorption capacity. The solvent absorption capacity states what volume of a solvent is necessary to fill the pore space of one gram of dry sorbent (preferably stationary phase) completely. As the solvent here, both pure water or aqueous media and also organic solvents such as dimethylformamide can be used. If the sorbent increases its volume (swelling) on wetting, the quantity of solvent used for this is automatically detected. For the measurement of the WAC, an exactly weighed quantity of dry sorbent is thoroughly wetted with an excess of effectively wetting solvent and excess solvent is removed from the inter-particle volume by centrifugation. During this, solvent within the pores of the sorbent is retained. The mass of the retained solvent is determined by weighing and converted into the volume via the density. The WAC of a sorbent is reported as volume per gram dry sorbent (mL/g).

The coating of the amino group-containing polymer on the porous support material is preferably present in the form of a hydrogel. This is in particular because the amino group-containing polymer has the aforesaid high concentration of amino groups. A hydrogel is here understood to mean a solvent- (preferably water-) containing, but solvent-soluble polymer, the molecules of which are chemically, e.g. by covalent or ionic bonds, or physically, e.g. by entanglement of the polymer chains, linked into a three-dimensional network. Because of built-in polar (preferably hydrophilic) polymer components, they swell in the solvent (preferably water) with considerable volume increase, without however losing their material cohesion. It is known of hydrogels from the state of the art that they to some extent lose their properties irreversibly when they are dried. In the present application, however, the hydrogels do not lose their properties, since they are chemically and mechanically stabilized by the porous support material. The amino group-containing coating is then present in particular as a hydrogel in the sorbent according to the invention, if this is present swollen in a solvent, i.e. in particular during the use for the binding of metals from solutions described below.

The porous support material is preferably a mesoporous or macroporous support material. The average pore size of the porous support material preferably lies in the range from 6 nm to 400 nm, more preferably in the range from 10 to 300 nm and most preferably in the range from 20 to 150 nm. A pore size in the stated range is important in order to ensure that the binding capacity is sufficiently high. For the case of too small a pore size, the amino group-containing polymer on the surface of the porous support material can block the pores and the internal volume of the pores is not filled with amino group-containing polymer. Furthermore, it is preferred that the porous support material has a pore volume in the range from 30 to 90 vol. %, more preferably from 40 to 80 vol. % and most preferably from 60 to 70 vol. %, in each case based on the total volume of the porous support material.

The average pore size of the porous support material can be determined by the pore filling method with mercury according to DIN 66133.

The porous support material can comprise an organic polymer, an inorganic material or a composite material of organic polymers and inorganic materials or consist thereof.

In order to be able to provide a sorbent which has a high sorbent stability over a range from pH 0 to pH 14, it is preferred if the porous support material is an organic polymer.

Preferably, the organic polymer for the porous support material is selected from the group which consists of polyalkyl, preferably with an aromatic unit in the side-chain (that is, bound to the polyalkyl chain), polyacrylate, polymethacrylate, polyacrylamide, polyvinyl alcohol, polysaccharides (e.g. starch, cellulose, cellulose esters, amylose, agarose, sepharose, mannan, xanthan and dextran), as well as mixtures thereof. Most preferably, the organic polymer is polystyrene or a derivative of polystyrene, which is preferably a copolymer of polystyrene (or derivative of polystyrene) and divinylbenzene. If the organic polymer bears an aromatic unit, then this is preferably present sulphonated. In a quite particularly preferred embodiment of the present invention, the organic polymer is a sulphonated crosslinked poly(styrene-co-divinylbenzene) or a derivative thereof.

If the porous support material is an inorganic material, or it comprises an inorganic material, the inorganic material is preferably an inorganic mineral oxide selected from the group which consists of silicon oxide, aluminium oxide, magnesium oxide, titanium oxide, zirconium oxide, fluorosil, magnetite, zeolites, silicates (e.g. kieselguhr), mica, hydroxyapatite, fluoroapatite, metal-organic base structures, ceramics, glass, porous glass (e.g. Trisoperl), metals, e.g. aluminium, silicon, iron, titanium, copper, silver and gold, graphite and amorphous carbon. Particularly preferably, the inorganic porous support material is a silicon dioxide or aluminium oxide, in particular silicon dioxide. The silicon dioxide is preferably silica gel.

In particular for reasons of the use in a wide pH range, in particular in the basic range, the porous support material is preferably an organic polymer.

The porous support material used according to the invention can be of homogeneous or heterogeneous composition, and therefore in particular incorporates materials which are made up of one or more of the aforesaid materials, for example in multilayer compositions.

The porous support material is preferably a particulate material with an average particle size in the range from 5 to 2000 µm, more preferably in the range from 10 to 1000 µm. The porous support material can also be a lamellar or fibrous material, such as for example a membrane or a foam. The external surface of the porous support material can thus be flat (lamellae, films, discs, membranes, fibre fabric or non-fibrous fabric) or curved (either concave or convex: spherical, granules, (hollow) fibres, tubes or capillaries).

As mentioned above, the porous support material is coated with an amino group-containing polymer which consists of individual polymer chains or comprises these. The polymer chains are preferably covalently linked together. The amino group-containing polymer is preferably not covalently linked with the surface of the porous support material.

The use of a non-covalently surface-bound crosslinked polymer as amino group-containing polymer on the porous support material also has the following three advantages: (1) flexibility of the polymer, since it is not covalently bound to the surface of the porous support material; (2) the crosslinking of the amino group-containing polymer ensures that the film remains on the surface of the porous support material and is not lost during the use of the sorbent; (3) the thickness of the amino group-containing polymer can be selected to be of appropriate size on the support material when the polymer is not covalently bound to the support material.

Adequate flexibility and permeability of the amino group-containing polymer is important so that several of the amino groups can come into a conformation which enables the metals to be multiply bound co-ordinately.

The high metal binding capacity of the sorbents according to the invention or of the sorbents produced according to the following processes according to the invention was surprising for the inventors for the following reasons:

- in spite of the almost complete filling of the pores of the support material with the amino group-containing polymer, the pores are accessible for the metals owing to the permeability of the polymer, as a result of which the sorbent according to the invention has a high metal binding capacity. This was all the more astonishing since polymer standards from inverse size exclusion chromatography exhibit no accessibility or permeability. This was also to be observed to over 90% even for the smallest standards with 450 Da.
- In contrast to normal chromatographic sorbents and metal-binding sorbents, which are based on the principle of surface functionalization, it was surprisingly found through the high metal-binding property that the present invention utilizes the entire volume of the polymer responsible for the binding and not only the surface thereof, i.e. the amino group-containing polymer together with the solvent containing the metals forms a so-called hydrogel, in which the polymer network exhibits nanoporosity. This has the effect that the metal binding capacity is not determined only by the surface of the support material, but rather by the volume of the polymer applied.
- The high metal binding capacity of the sorbents according to the invention or sorbents produced according to the invention is due to the formation of chemical complexes between groups of the amino group-containing polymer and the metals to be bound. These groups can be the amino groups themselves, or can be residues which have Lewis base properties, which are bound to the amino group-containing polymer (as described below). This for example results in the advantage of the high salt tolerance and binding capacity in the acidic medium compared to classical ion exchangers.
- In parallel to the formation of chemical complexes via which the metals are bound, the phase still also has a very high binding capacity for anions, e.g. sulphate, phosphate, nitrite, nitrate, chromate, arsenate, etc.

The amino group-containing polymer on the sorbent according to the invention is preferably a polymer which has primary and/or secondary amino groups. It can be a polymer of the same repeating units (polymerized monomers), but it can also be a copolymer which preferably has simple alkene monomers or polar, inert monomers such as vinylpyrrolidone as comonomers.

Examples of the amino group-containing polymer are the following: polyamines, such as any polyalkylamines, e.g. polyvinylamine and polyallylamine, polyethyleneimine, polylysine etc. Among these, polyalkylamines are preferred, and polyvinylamine and poly-allylamine still more preferred, with polyvinylamine being particularly preferred.

According to a preferred embodiment of the sorbent according to the invention, the amino group-containing polymer has a degree of crosslinking of at least 2%, based on the total number of crosslinkable groups in the amino group-containing polymer. More preferably, the degree of crosslinking lies in the range from 2.5 to 60%, more preferably in the range from 5 to 50% and most preferably in the range from 10 to 40%, in each case based on the total number of crosslinkable groups in the amino group-containing polymer. The degree of crosslinking can be adjusted with the appropriately desired quantity of crosslinking agent. Here it is assumed that 100 mol. % of the crosslinking agent reacts and forms crosslinkages. This can be verified by analytical methods such as by MAS-NMR spectroscopy and quantitative determination of the quantity of the crosslinking agent relative to the quantity of the polymer used. This method is to be preferred according to the invention. The degree of crosslinking can, however, also be determined by IR spectroscopy based on, for example, C—O—C or OH-vibrations using a calibration curve. Both methods are standard analytical methods for a person skilled in the art in this field. If the degree of crosslinking lies above the stated upper limit, the polymer coating of the amino group-containing polymer is not flexible enough and results in a lower metal binding capacity. If the degree of crosslinking is below the stated lower limit, the polymer coating is not sufficiently stable on the surface of the porous support material.

The crosslinking agent has two, three or more functional groups through the binding of which to the polymer the crosslinking takes place. The crosslinking agent which is used for crosslinking the amino group-containing polymer is preferably selected from the group which consists of dicarboxylic acids, tricarboxylic acids, urea, bis-epoxides or tris-epoxides, diisocyanates or triisocyanates, and dihaloalkylene or trihaloalkylene, with dicarboxylic acids and bis-epoxides being preferred, such as for example terephthalic acid, biphenyldicarboxylic acid, ethylene glycol diglycidyl ether and 1,12-bis-(5-norbornene-2,3-dicarboximido)-decanedicarboxylic acid, with ethylene glycol diglycidyl ether and 1,12-bis-(5-norbornene-2,3-dicarboximido)-decanedicarboxylic acid being more preferred. In one embodiment of the present invention, the crosslinking agent is preferably a linear, conformationally flexible molecule with a length between 4 and 20 atoms.

The preferred molecular weight of the amino group-containing polymer of the sorbent according to the invention preferably lies in the range from 5000 to 50,000 g/mol, which applies in particular for the polyvinylamine used.

The sorbent according to the invention can, in a further embodiment, also have organic residues which are bound onto the amino group-containing polymer and have the nature of a Lewis base. Here it is particularly preferred that the organic residue is bound onto an amino group of the amino group-containing polymer. Also it is particularly preferred that the amino group onto which the organic residue is bound after the binding is a secondary amino group, so that this also still displays sufficient Lewis basicity, but without being sterically hindered.

In a further embodiment, the present invention also relates to a process for the production of a sorbent, preferably a sorbent according to the invention, which contains the following steps (preferably in the stated order):

(a) provision of a porous support material;
  (b) application of an amino group-containing polymer onto the porous support material by a pore filling method;
  (c) removal of the solvent used in the pore filling method;
  (d) repetition of steps (b) and (c); and
  (e) crosslinking of the amino group-containing polymer.

In the process according to the invention for the production of a sorbent, the porous support material provided in step (a) is one as mentioned above in connection with the sorbent according to the invention. The preferred embodiments mentioned there apply here to the same extent.

In step (b) of the process according to the invention, a non-crosslinked amino group-containing polymer, as is described above in connection with the amino group-containing polymer of the sorbent according to the invention, is preferably used. The preferred embodiments mentioned there apply here to the same extent.

The pore filling method in step (b) of the application of the amino group-containing polymer onto the porous support material in the process according to the invention entails the advantage compared to conventional impregnation processes that overall a larger quantity of amino group-containing polymer can be applied onto the porous support material, as a result of which the binding capacity for metals is increased. This results in the aforesaid surprising advantages.

The pore filling method is in general understood to mean a special coating method in which a solution which contains the amino group-containing polymer, is applied onto the porous support material in the quantity which corresponds to the total volume of the pores of the porous support material. Here, the total volume of the pores of the porous support material in step (b), i.e. the first application, is determined beforehand as stated above.

In step (c) of the process according to the invention, the solvent used for the pore filling method is preferably removed by drying the material at temperatures in the range from 40° C. to 90° C., more preferably in the range from 50° C. to 70° C. and most preferably in the range from 50° C. to 60° C. During this, drying is in particular effected at a pressure in the range from 0.01 to 1 bar, more preferably at a pressure in the range from 0.1 to 0.5 bar.

It is an essential step of the process according to the invention for the production of a sorbent that in a step (d) after the drying or removal of the solvent from the first step of the application by pore filling method, the steps (b) and (c) of the application of an amino group-containing polymer onto the porous support material by a pore filling method are repeated. For this, the total volume of the pores which is available for the repeated application of the amino group-containing polymer onto the porous support material is determined after step (b) by differential weighing of the wet and the dry material. In a further embodiment of the process according to the invention, it is moreover preferred that the steps (b) and (c) are repeated at least twice. The total volume of the pores available for the pore filling method is also determined by differential weighing of the wet and the dry materials before the second repetition of steps (b) and (c). The repetition of steps (b) and (c) preferably takes place in the stated order.

After the steps of the application of the amino group-containing polymer, the crosslinking of the amino group-containing polymer takes place in a step (e), preferably by the crosslinking agent stated in connection with the sorbent according to the invention. All features stated above in connection with the sorbent according to the invention with regard to the crosslinking also apply to the production process according to the invention.

It is further preferred that between the multiple steps of the application of an amino group-containing polymer onto the porous support material by a pore filling method, no crosslinking of the amino group-containing polymer takes place.

Preferably the removal of the solvent used in the pore filling method each time is effected by drying in a ploughshare dryer, since this step can be markedly accelerated thereby.

In a further embodiment, in the process according to the invention the steps (b) and (c) are repeated before the step (e) sufficiently often that the concentration of the amino groups of the sorbent determined after step (e) by titration is at least 600 μmol/mL, more preferably at least 800 μmol/mL, still more preferably at least 1000 μmol/mL and most preferably at least 1200 μmol/mL, in each case based on the total volume of the sorbent. The upper limits of the concentration of the amino groups of the sorbent stated above in connection with the sorbent according to the invention are also the upper limits preferred in the process according to the invention.

In a further embodiment of the process according to the invention, it is preferred that the ratio of the mass of the amino group-containing polymer to the total volume of the pores of the porous support material after step (d) is greater than or equal to 0.1 g/mL, more preferably greater than or equal to 0.125 g/mL, and most preferably greater than or equal to 0.15 g/ml. The upper limit of this ratio is preferably about at most 0.5 g/mL, more preferably at most 0.4 g/mL and most preferably at most 0.3 g/mL.

In the pore filling method in step (b) of the process according to the invention, as solvent for the amino group-containing polymer, one in which the amino group-containing polymer is soluble is preferably used. The concentration of the amino group-containing polymer in the solvent used for the pore filling method in step (b) of the process according to the invention preferably lies in the range from 5 g/L to 200 g/L, more preferably in the range from 10 g/L to 180 g/L, most preferably in the range from 30 to 160 g/L. A concentration below the stated lower limit has the disadvantage that the steps (b) and (c) would have to be performed too often in order to achieve the desired concentration of the amino groups of the sorbent determined by titration, which ensures a sufficient binding capacity for metals. A concentration above the stated upper limit does not ensure that the polymer can penetrate to a sufficient extent into the pores of the porous support material.

In a further embodiment of the process according to the invention it is preferred that in a step (f)—preferably after the step (e)—an organic residue which has the nature of a Lewis base is bound onto the amino group-containing polymer. Here it is particularly preferred that the organic residue is bound onto the amino groups of the amino group-containing polymer. It is further preferred here that after the binding of the organic residue, the amino groups are present as secondary amino groups, so that their Lewis basicity is not lost and no steric hindrance to the binding of the amino groups to the metals arises. An organic residue which has the nature of a Lewis base is understood in particular to refer to residues which enter into complex bonding with the metal to be bound.

Organic residues which contain a Lewis base are for example those which contain hetero atoms with free electron pairs, such as N, O, P, As or S.

All preferred embodiments mentioned above in connection with the sorbent according to the invention apply to the same extent for the sorbent produced by the process according to the invention, or for the components used in the process according to the invention.

In a further embodiment, the present invention also relates to a sorbent which is obtainable by the process according to the invention, in particular a sorbent which is obtainable by a process according to the invention, wherein in a step (f) an organic residue which has the nature of a Lewis base is bound onto the amino group-containing polymer. Such a sorbent can through the functionalization with an organic residue also have a concentration of the amino groups of the sorbent determined by titration of less than the limit stated above, and is however in particular characterized in that through the single or multiple repetition of steps (b) and (c) in the process according to the invention, the freely accessible pores of the support material are essentially completely filled with the amino group-containing polymer (this is achieved when the WAC is less than 0.5 wt. %), or the ratio of the mass of the amino group-containing polymer to the total volume of the porous support material after step (d) lies in the range stated above. Such a sorbent, which has an organic residue which has the nature of a Lewis base, is also intended to include those sorbents which after the removal of the organic residue from the amino group-containing polymer have a concentration of the amino groups of the sorbent determined by titration of at least 600 μmol/mL, based on the total volume of the sorbent.

A further embodiment of the present invention relates to the use of a sorbent for binding metals from solutions, wherein the sorbent is either a porous support material coated with an amino group-containing polymer, wherein the concentration of the amino groups of the sorbent determined by titration is at least 300 μmol/mL, more preferably at least 400 μmol/mL, and still more preferably 500 μmol/mL, or wherein the sorbent is a sorbent obtainable by the process according to the invention.

In other words the present invention also relates to a process for binding metals from solutions using a sorbent, wherein the sorbent is either a porous support material coated with an amino group-containing polymer, wherein the concentration of the amino groups of the sorbent determined by titration is at least 300 μmol/mL, more preferably at least 400 μmol/mL, and still more preferably 500 μmol/mL, or wherein the sorbent is a sorbent obtainable by a process according to the invention.

The solutions from which metals are to be bound can according to the invention be concentrated or dilute, aqueous or non-aqueous, acidic, basic or neutral solutions.

The metals of the present application are preferably metals which are present in the said solutions in ionic form or also as metal-ligand coordination compounds in ionic form. The metals are preferably complex-forming metals, i.e. metals which can enter into a metal-ligand coordination bond. More preferably, the metals are transition metals or metals of the rare earths, still more preferably noble metals or rare earths. Quite particularly preferably, the metals are copper, nickel and chromium.

In a further embodiment of the use according to the invention, the solutions from which the metals are to be bound are solutions which have a salt content of alkali metal ions of at least 5 g/l.

Furthermore, the solutions from which the metals are to be bound are preferably aqueous solutions, in particular also an acidic aqueous solution, with a pH of ≤5, more preferably ≤4 and still more preferably ≤3.

For binding the metals from solutions, the metal-containing solutions are brought into contact with the sorbent according to the invention. This can for example take place in a normal column. At the same time, sorbents according to the invention which have been developed for binding different metals can also be present mixed together. This is as a rule effected through the binding of different organic residues onto the amino group-containing polymer.

Similarly, the contacting of the sorbent according to the invention with the metal-containing solution can also be performed in batch mode, i.e. without passage of the solution through a vessel with the sorbent, but rather in the form of a suspension of the sorbent in the solution.

The present invention will now be illustrated on the basis of the following figures and examples, which are however only to be regarded as by way of example:

EXAMPLES SECTION

Analytical Methods:
Determination of the Concentration of the Amino Groups of a Sorbent by Breakthrough Measurement with 4-Toluenesulphonic Acid (Titration Analysis):

The dynamic anion exchange capacity is determined with a column of the stationary phase to be tested. For this, firstly all exchangeable anions in the column are exchanged against trifluoroacetate. Then the column is rinsed with an aqueous reagent solution of toluene-4-sulphonic acid until this solution emerges again in the same concentration at the end of the column (breakthrough). From the concentration of the toluene-4-sulphonic acid solution, its flow rate and the area of the breakthrough in the chromatogram, the quantity of toluene-4-sulphonic acid bound by the column is calculated. The quantity of toluene-4-sulphonic acid thus determined gives the concentration of the amino groups of the sorbent.

The dynamic anion exchange capacity for toluene-4-sulphonic acid in water is related to the phase volume and reported in mmol per litre (mM/L).

Example 1: Production of a Sorbent According to the Invention 200 g of a sulphonated polystyrene/divinylbenzene support material (average pore size 30 nm) are weighed into a vessel. This material has a pore volume determined from the WAC of 1.48 mL/g. In the first coating the pore volume should be 95% filled. The polymer solution for the coating is prepared. 165.3 g of a polyvinylamine solution (solids content 12.1 wt. %) are diluted with 108 g water. The pH of the solution is adjusted to 9.5 with 7 ml conc. hydrochloric acid. The polymer solution is added to the support and mixed for 3 hrs on the overhead shaker. Next, the coated support is dried for 48 hrs at 50° C. in the vacuum drying cabinet at 25 mBar. The material has lost 197.7 g water through the drying. The material is coated for the second time. For this, 165.0 g polyvinylamine solution (solids content 12.1 wt. %) are adjusted to a pH of 9.5 with 6.8 mL conc. HCl and diluted with 20 g water. The polymer solution is added to the support and mixed for 3 hrs on the overhead shaker. Next, the coated support is dried for 48 hrs at 50° C. in the vacuum drying cabinet at 25 mBar. The material has lost 181.2 g water through the drying. The material is coated for the third time. For this, 165.2 g polyvinylamine solution (solids content 12.1%) are adjusted to a pH of 9.5 with 7.1 mL conc. HCl and diluted with 5 g water. The polymer solution is added to the support and mixed for 3 hrs on the overhead shaker. The phase is then dried to constant weight in the vacuum drying cabinet at 50° C. and 25 mBar.

The material was coated in 3 steps with a total of 0.20 g PVA per mL pore volume.

The dried material was suspended in 1.5 L isopropanol in a double-jacket reactor and crosslinked with 24.26 g ethylene diglycol diglycidyl ether at 55° C. within 6 hrs.

The coated material is washed with the following solvents: 600 mL isopropanol, 3600 mL 0.1 M HCl, 1800 mL water, 1800 mL 1 M NaOH, 1800 mL water and 1800 mL methanol.

The material is then dried. Yield 275 g dried material.

Analysis: the concentration of the amino groups determined by titration is 963 µmol/mL.

Comparison Example 1: Production of a Conventional Sorbent

The conventional sorbent is a silica gel modified with 2-aminoethyl sulphide ethyl ((Si)-$CH_2$—$CH_2$—S—$CH_2$—$CH_2$—$NH_2$) with a particle size of >45 µm (Manufacturer Phosphonics, Supplier Sigma-Aldrich, Catalogue number: 743453-10G; 0.8-1.3 mmol/g loading).

The modification can be effected by reaction of silica gel with 3-mercapto-propyl-trimethoxysilane and subsequent reaction with ethylimine.

Example 2: Use of the Sorbents Produced According to Example 1 and Comparison Example 1 for Binding Copper from Aqueous Solutions For plotting isotherms in FIGS. 1 and 2, the following procedure was used:

10 samples each of approx. 100 mg of the sorbent are precisely weighed out and in each case incubated with different aqueous Cu-II solutions (as $CuSO_4$) of different concentration for at least 1.5 hrs. The sorbent is filtered off and the Cu-II concentration in solution determined photometrically. From the remaining concentration of copper, the quantity of copper bound is calculated and the isotherms generated.

Figure 1:
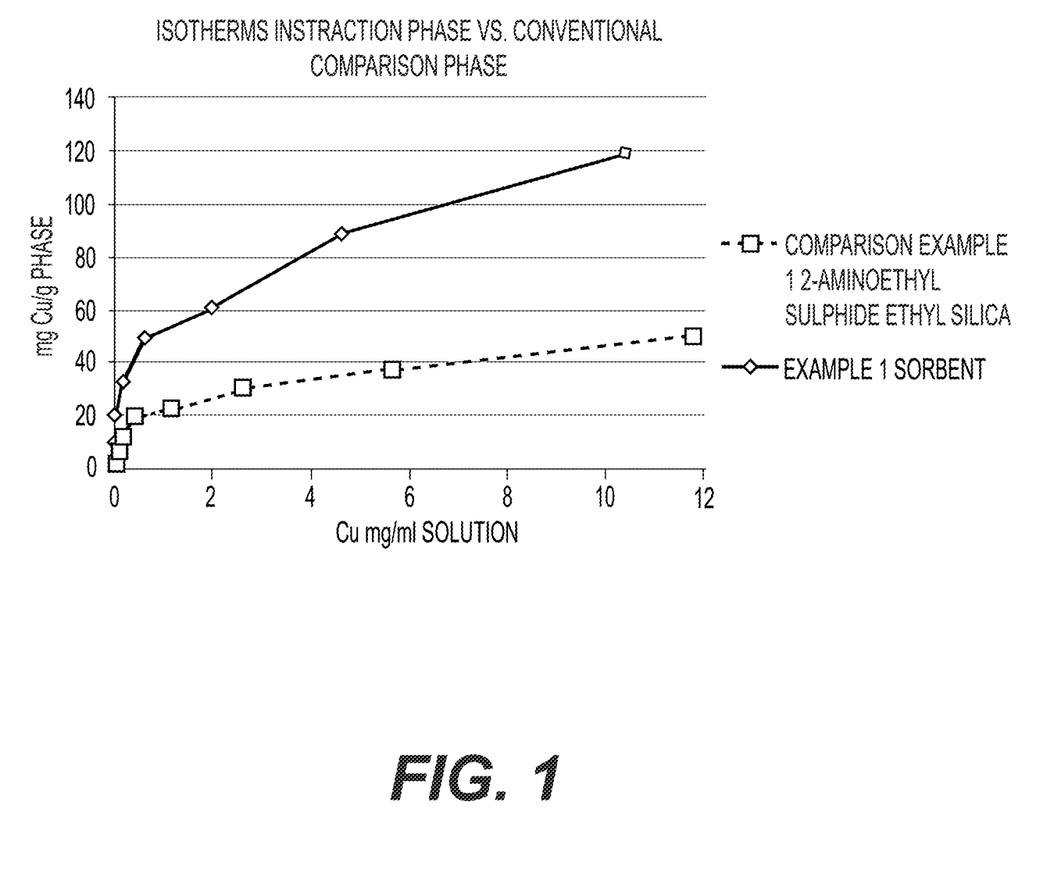
FIGS. 1 and 2 show the comparison of the isotherms of the sorbents from Example 1 and comparison example 1 in the binding of copper from aqueous solutions according to Example 2.
Figure 2:
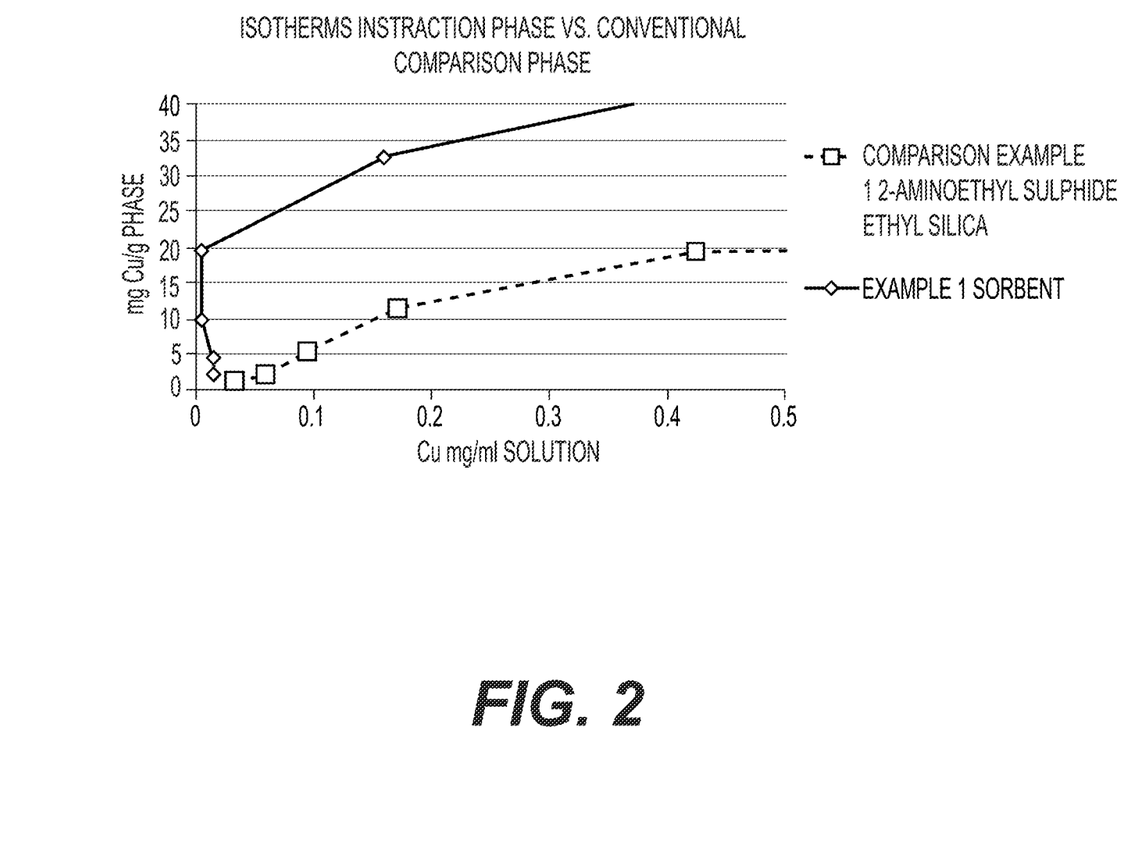

From the comparison of the isotherms in FIGS. 1 and 2, it can be seen that the sorbent according to the invention has a considerably higher binding capacity than the conventional sorbent. From the approximated rectangular isotherms for the sorbent according to the invention it can be seen that this shows very strong bonding without actual establishment of equilibrium. This also allows the almost complete removal of heavy metals from very dilute solutions.

Example 3: Use of the Sorbent Produced According to Example 1 for Binding the Three Transition Metals Nickel, Copper and Chromium from a Solution In each case 10 samples of a defined quantity of the sorbent are precisely weighed out and in each case incubated with different aqueous metal solutions of different concentration for at least 1.5 hrs. The sorbent is filtered off and the metal concentration in solution determined photometrically or with a metal determination method according to Hach-Lange (preferably photometrically). From the remaining concentration of metal, the quantity of metal bound is calculated and the isotherms generated.

Figure 3:
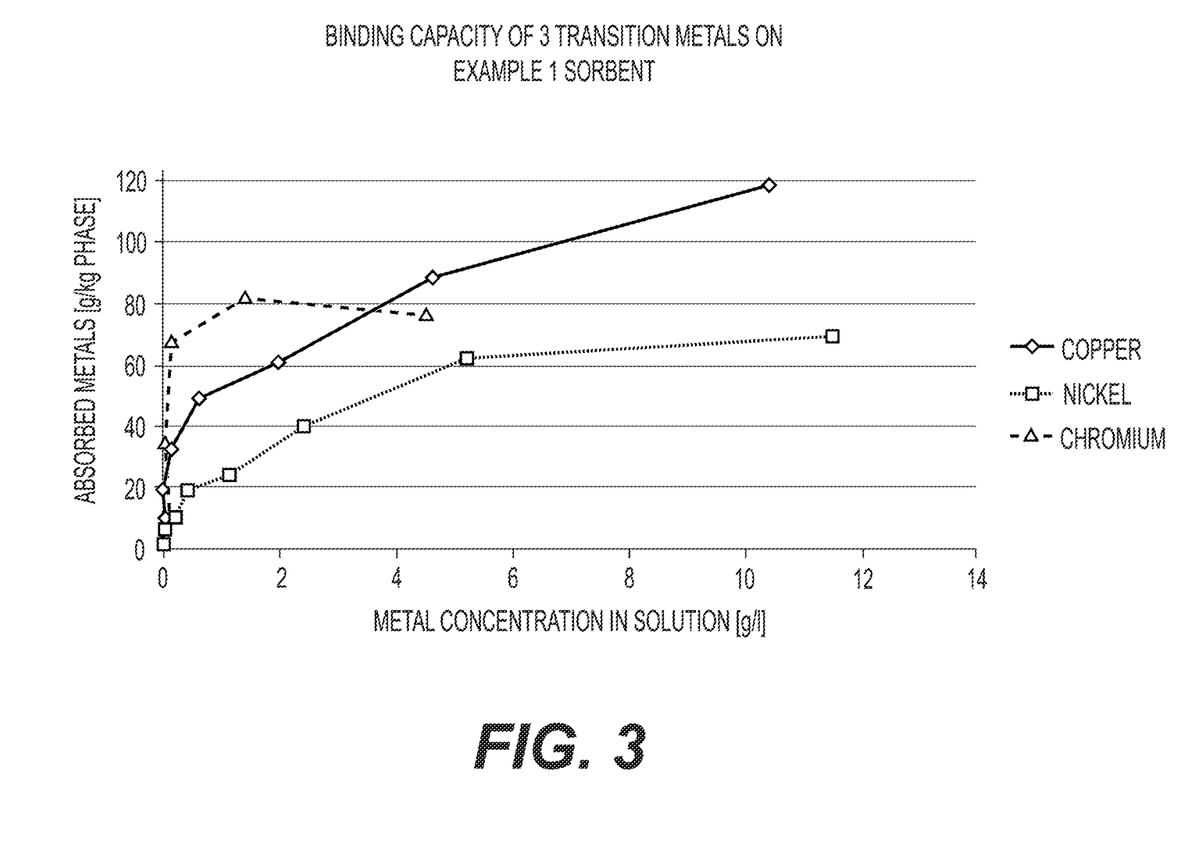
FIG. 3 shows the metal binding capacity of the sorbent from Example 1 for the metals copper, nickel and chromium as a function of the metal concentration according to Example 3.

From FIG. 3 it can be seen that the sorbent according to the invention binds the metals nickel (~70 mg/g sorbent), copper (~120 mg/g sorbent) and chromium (~80 mg/g sorbent) to a high degree. The same could also be shown for solutions with the metals palladium, lead and iridium.

Example 4: Use of the Sorbent Produced According to Example 1 for Binding Metals from Solutions with a High Salt Content 5 samples of approx. 100 mg of the sorbent are precisely weighed out and each incubated for at least 0.5 hrs with a solution of Cu (as $CuSO_4*5H_2O$=50 mg/ml water), which contain 0 M NaCl, 0.01 M NaCl, 0.1 M NaCl, 0.5 M NaCl and 1 M NaCl respectively. Next, the sorbent is filtered off and the copper concentration in the filtrate determined photometrically. From the remaining concentration of metal, the quantity of copper bound is calculated and the isotherms generated.

Figure 4:
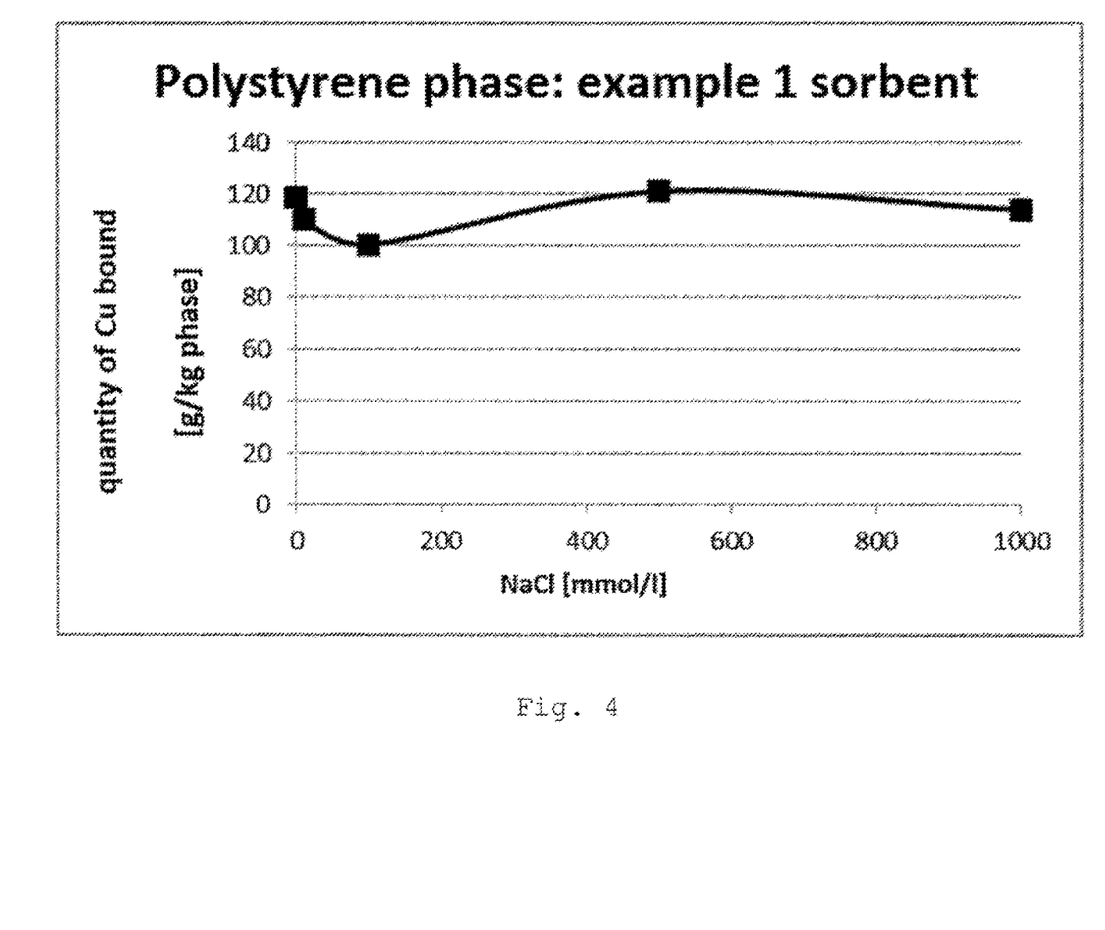
FIG. 4 shows the quantity of absorbed copper [g] per quantity of sorbent [kg] in the presence of different concentrations of NaCl according to Example 4.

As can be seen from FIG. 4, even at concentrations of up to 1 M common salt, the binding capacity of copper is >100 mg Cu/g sorbent. This shows that a non-ionic binding mechanism is involved, which thus markedly differs from ion exchangers "customary in the trade".

There is no competition for binding sites of copper with sodium, which is not complexed. The binding capacity for copper is thus maintained.

This property allows the use of the phase in the treatment of drinking, surface, pit, and waste waters, seawater desalination plants, chloralkali electrolysis etc. in which alkali and alkaline earth metals ubiquitously occurring and present in large excess must not interfere.

Example 5: Binding Rate of a Sorbent Produced According to Example 1

Samples each with approx. 100 mg of the phase are precisely weighed out and incubated with a Cu solution (as $CuSO4*5H2O$=50 mg/ml water) for the stated period. Next, the sorbent is filtered off and the copper concentration in the filtrate determined photometrically. From the remaining concentration of metal the quantity of copper bound is calculated.

Figure 5:
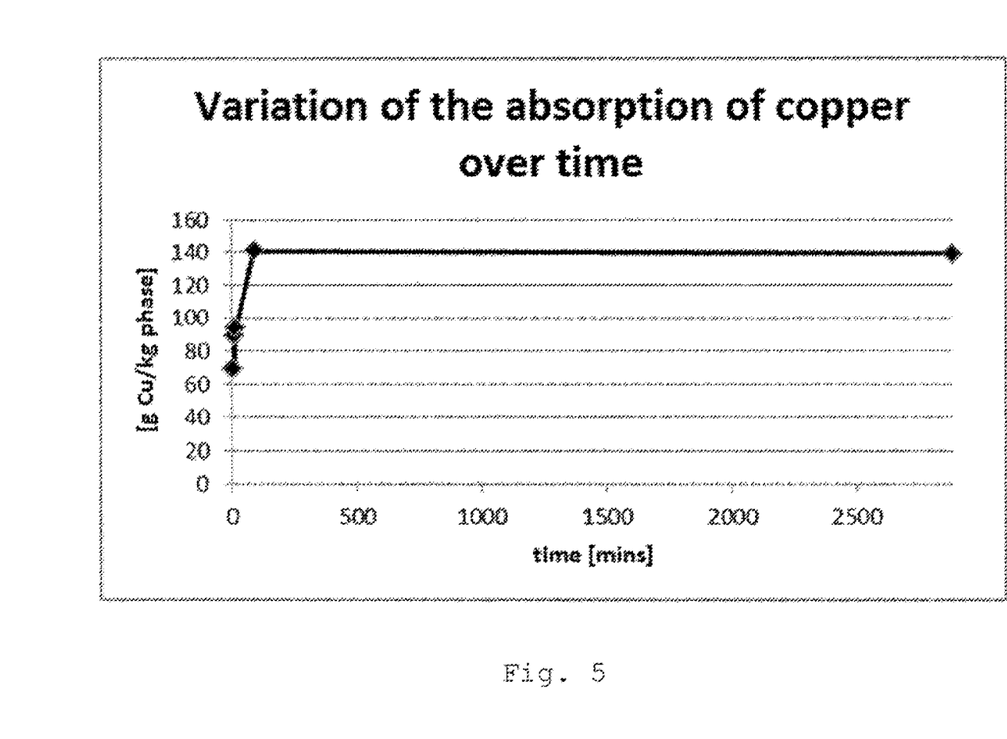
FIGS. 5 and 6 show the variation over time from Example 5 for the absorption of copper of a sorbent from Example 1.
Figure 6:
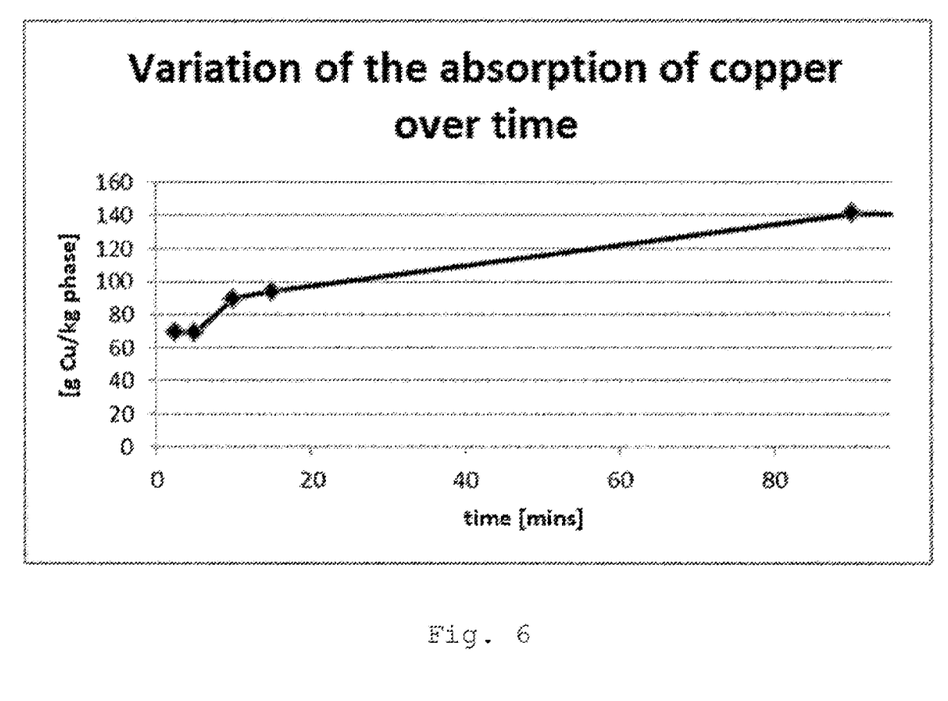

FIGS. 5 and 6 show the binding of copper from solutions against time. After about 90 minutes, all binding sites of the sorbent are occupied by copper. No change in the concentration is to be observed even after 48 hours.

Example 6: Reusability of the Sorbent Produced According to Example 1

Figure 7:
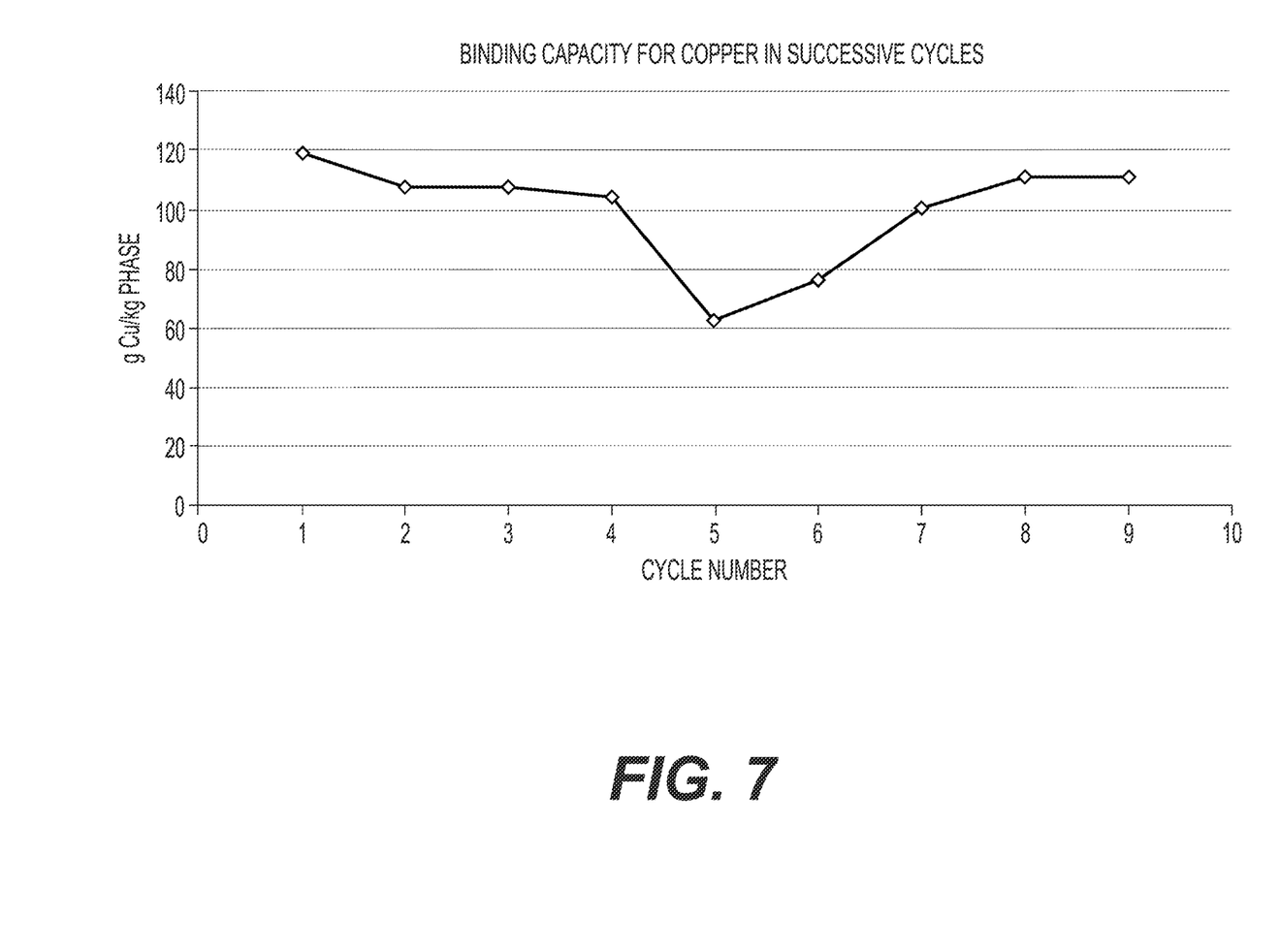
FIG. 7 shows the binding capacity for copper after regeneration of the sorbent after various cycles according to Example 6.

1 g of the sorbent from Example 1 is weighed out and treated as follows:
1. Rinsing with 1 M NaOH (3×5 ml)
2. water (3×5 ml rinsed).
3. Addition of 50 ml Cu (as $CuSO_4*5H_2O$, 50 mg/ml)
4. Incubation for 90 mins
5. Filtration
6. Determination of the copper concentration in the filtrate (photometrically) and calculation of the quantity of copper bound
7. Repetition of the procedure As can be seen from FIG. 7, the binding capacity of copper remains unimpaired after 10 cycles of regeneration and reuse of the sorbent after 10 cycles (with the exception of cycles 5 and 6) even with treatment with 5 M HCL and 1 M NaOH.

Example 7: Comparison of Multiply Coated Sorbents with a Singly Coated Sorbent Production of a Singly Coated Sorbent on a Silica Support:
100 g silica gel AGC D-50-120A (average pore size 12 nm) are weighed into a vessel. This material has a pore volume determined from the WAC of 1.12 mL/g. The polymer solution for the coating is prepared. 79.6 g of a polyvinylamine solution (solids content 11.3 wt. %) are diluted with 20 g water. The pH of the solution is adjusted to 9.5 with 3 ml conc. hydrochloric acid. The polymer solution is added to the support and mixed for 6 hrs on a screening machine. Next, the coated support is dried for 48 hrs at 50° C. in the vacuum drying cabinet at 25 mbar.

The material was coated with 0.08 g PVA per mL pore volume.

The dried material was suspended in 0.5 L isopropanol in a double-jacket reactor and crosslinked with 3.64 g ethylene diglycol diglycidyl ether at 55° C. within 6 hrs.

The coated material is washed with the following solvents: 400 mL isopropanol, 1200 mL 0.1 M HCl, 400 mL water, 800 mL 0.5 M triethylamine in water, 600 mL water and 600 mL methanol.

The material is then dried. Yield 108.0 g dried material.

Analysis: the concentration of the amino groups determined by titration is 593 µmol/mL.

Production of a Doubly Coated Sorbent on a Silica Support:

250 g silica gel AGC D-50-120A (average pore size 12 nm) are weighed into a vessel. This material has a pore volume determined from the WAC of 1.12 mL/g. The polymer solution for the coating is prepared. 200 g of a polyvinylamine solution (solids content 11.3 wt. %) are diluted with 60 g water. The pH of the solution is adjusted to 9.5 with 7.5 ml conc. hydrochloric acid. The polymer solution is added to the support and mixed by vibration for 6 hrs on the screening machine. Next, the coated support is dried for 48 hrs at 50° C. in the vacuum drying cabinet at 25 mbar. The material has lost 230 g water through the drying. The material is coated for the second time. For this, 200 g polyvinylamine solution (solids content 11.3 wt. %) are adjusted to a pH of 9.5 with 6.8 mL conc. HCl and diluted with 23 g water. The polymer solution is added to the support and again mixed by vibration for 6 hrs on the screening machine. Next, the coated support is dried for 48 hrs at 50° C. in the vacuum drying cabinet at 25 mbar.

The material was coated with 0.16 g PVA per mL pore volume.

The dried material was suspended in 1.5 L isopropanol in a double-jacket reactor and crosslinked with 18.2 g ethylene diglycol diglycidyl ether at 55° C. within 6 hrs.

The coated material is washed with the following solvents: 1000 mL isopropanol, 3000 mL 0.1 M HCl, 1000 mL water, 2000 mL 0.5 M triethylamine in water, 1500 mL water and 1500 mL methanol.

The material is then dried. Yield 308 g dried material.

Analysis: the concentration of the amino groups determined by titration is 1254 µmol/mL.

Production of a Triply Coated Sorbent on a Silica Support:

250 g silica gel AGC D-50-120A (average pore size 12 nm) are weighed into a vessel. This material has a pore volume determined from the WAC of 1.12 mL/g. The polymer solution for the coating is prepared. 199 g of a polyvinylamine solution (solids content 11.3 wt. %) are diluted with 60 g water. The pH of the solution is adjusted to 9.5 with 7.6 ml conc. hydrochloric acid. The polymer solution is added to the support and mixed by vibration for 6 hrs on the screening machine. Next, the coated support is dried for 48 hrs at 50° C. in the vacuum drying cabinet at 25 mbar. The material has lost 231 g water through the drying. The material is coated for the second time. For this, 200 g polyvinylamine solution (solids content 11.3 wt. %) are adjusted to a pH of 9.5 with 7.0 mL conc. HCl and diluted with 24 g water. The polymer solution is added to the support and again mixed by vibration for 6 hrs on the screening machine. Next, the coated support is dried for 48 hrs at 50° C. in the vacuum drying cabinet at 25 mbar. The material has lost 210 g water through the drying. The material is coated for the third time. For this, 199 g polyvinylamine solution (solids content 11.3 wt. %) are adjusted to a pH of 9.5 with 7.0 mL conc. HCl and diluted with 4 g water. The polymer solution is added to the support and again mixed by vibration for 6 hrs on the screening machine. Next, the coated support is dried for 48 hrs at 50° C. in the vacuum drying cabinet at 25 mbar.

The material was coated with 0.24 g PVA per mL pore volume.

The dried material was suspended in 1.5 L isopropanol in a double-jacket reactor and crosslinked with 27.3 g ethylene diglycol diglycidyl ether at 55° C. within 6 hrs.

The coated material is washed with the following solvents: 1000 mL isopropanol, 3000 mL 0.1 M HCl, 1000 mL water, 2000 mL 0.5 M triethylamine in water, 1500 mL water and 1500 mL methanol.

The material is then dried. Yield 330 g dried material.

Analysis: the concentration of the amino groups determined by titration is 1818 µmol/mL.

Figure 8:
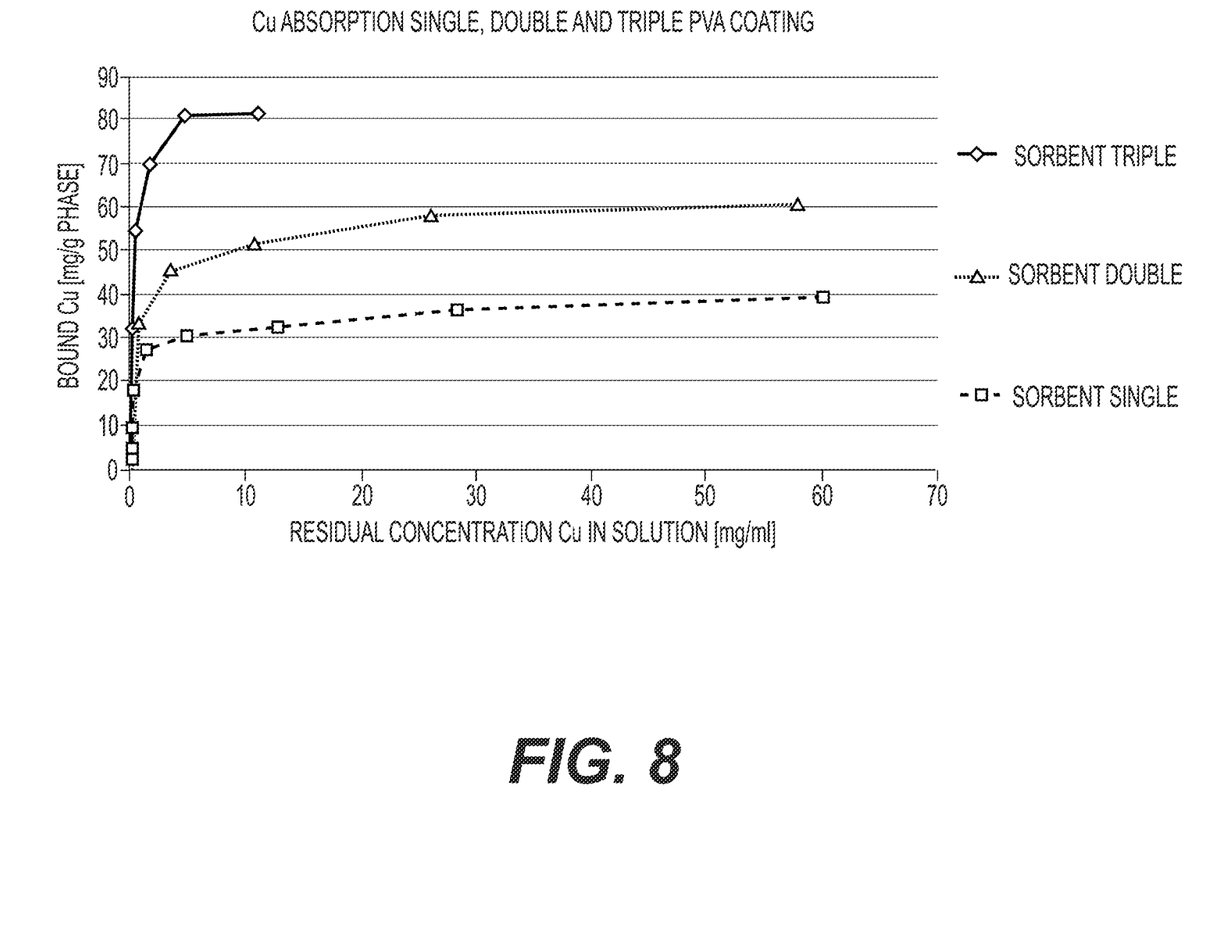
FIG. 8 shows the comparison of the copper binding by multiply coated sorbents with a singly coated sorbent according to Example 7.

FIG. 8 shows unambiguously that the binding capacity with the doubly and the triply coated sorbent increases drastically compared to the singly coated sorbent.

Comparison Example 2: Production of a Sorbent According to Example 2 of DE 10 2011 107 197 A1

As the base for the sorbent, Amberchrom CG1000S from Rohm & Haas is used. This is sulphonated as follows: for this, 165 mL conc. $H_2SO_4$ are placed in a temperature-controllable 250 mL reactor. 30.0 g of the support material are added to the sulphuric acid and the weighing bottle then rinsed three times in each case with 20 mL conc. sulphuric acid. After the addition of the support material, the suspension is stirred and maintained at 80° C. After 3 hrs reaction time, the suspension is discharged from the reactor and distributed into two 150 mL syringes. The sulphuric acid is removed under suction and the phase successively rinsed with 200 mL diluted (62%) sulphuric acid, 125 mL water, 175 mL methanol, 125 mL water and finally with 175 mL methanol. The phase is suction dried and then dried at 50° C. under vacuum. The water absorption capacity or the pore volume of the resulting sulphonated polystyrene is determined by weighing the dried, sulphonated polystyrene, treating with the same volume of water and then centrifuging off excess water. The water present in the pores remains in place during this.

For the coating of the polystyrene, an aqueous polyvinylamine solution is prepared, which consists of polyvinylamine with an average molar weight of 35,000 g/mol. The pH is adjusted to 9.5. The quantity of polyvinylamine here is 15% of the polystyrene to be coated, and the volume of the solution is 95% of the determined pore volume of the polystyrene. The polyvinylamine solution together with the polystyrene is placed in a firmly closed PE bottle and shaken at high frequency for 6 hours on a screening shaker. During this, attention must be paid to adequate mixing. After the procedure, the polyvinylamine solution has worked itself into the pores of the polystyrene. The polystyrene is then dried to constant weight at 50° C. in the vacuum drying cabinet.

For the crosslinking of the polyvinylamine, the coated polystyrene is taken up in three times the volume of isopropanol and treated with 5% diethylene glycol diglycidyl ether, based on the amino group count of the polyvinylamine. The reaction mixture is stirred for six hours in the reactor at 55° C. Next, it is transferred onto a glass suction filter and rinsed with 2 bed volumes isopropanol, 3 bed volumes 0.5 M TFA solution, 2 bed volumes water, 4 bed volumes 1 M sodium hydroxide solution and finally 8 bed volumes water.

Analysis: the concentration of the amino groups determined by titration is 265 µmol/mL.

The invention claimed is:

1. A sorbent comprising a porous support material coated with an amino group-containing polymer, wherein the concentration of the amino groups of the sorbent determined by titration is at least 600 µmol/mL, based on the total volume of the sorbent,
wherein:
the porous support material comprises an organic polymer or a composite material of an organic polymer and an inorganic material,
the amino group-containing polymer is selected from the group consisting of polyvinylamine, polyallylamine and polylysine,
the amino group-containing polymer is crosslinked with the porous support material and is not covalently linked to the porous support material,
the sorbent is capable of binding a metal from a solution at a pH of ≤5.

2. The sorbent according to claim 1, wherein the ratio of the mass of the amino group-containing polymer to the total volume of pores of the porous support material is greater than or equal to 0.1 g/mL.

3. The sorbent according to claim 1, wherein pore volume of the porous support material is in a range from 30 to 90 vol. %, based on the total volume of the porous support material.

4. The sorbent according to claim 1, wherein the porous support material has an average pore size in a range from 6 nm to 400 nm.

5. A process for the production of a sorbent for binding a metal from a solution according to claim 1, comprising:
(a) providing a porous support material comprising an organic polymer or a composite material of an organic polymer and an inorganic material;
(b) applying an amino group-containing polymer onto the porous support material by a pore filling method, wherein the pore filling method comprises a solvent and the amino group-containing polymer is selected from the group consisting of polyvinylamine, polyallylamine and polylysine;
(c) removing the solvent used in the pore filling method;
(d) repeating steps (b) and (c); and
(e) crosslinking the amino group-containing polymer.

6. The process according to claim 5, wherein the steps (b) and (c) are repeated before the step (e) such that the concentration of the amino groups of the sorbent determined after step (e) by titration is at least 600 µmol/mL, based on the total volume of the sorbent.

7. The process according to claim 5, wherein the ratio of the mass of the amino group-containing polymer to the total volume of pores of the porous support material after step (d) is greater than or equal to 0.1 g/mL.

8. The process according to claim 5, wherein step (c) is performed at a temperature in a range from 40 to 80° C. and/or a pressure in a range from 0.01 bar to 1 bar.

9. The process according to claim 5, wherein the concentration of the amino group-containing polymer in the solvent used for the pore filling method in step (b) lies in a range from 5 g/L to 200 g/L.

10. The process according to claim 5, further comprising:
(f) binding an organic residue which contains a Lewis base onto the amino group-containing polymer.

11. A sorbent which is obtained according to the process according to claim 5.

12. A method of binding metals from solutions with a pH of ≤5, comprising contacting a solution containing at least one metal and having a pH of ≤5 with the sorbent according to claim 11.

13. A method of binding metals from solutions with a pH of ≤5, comprising contacting a solution containing at least one metal and having a pH of ≤5 with the sorbent of claim 1.

14. A sorbent comprising a porous support material coated with an amino group-containing polymer, wherein the concentration of the amino groups of the sorbent determined by titration is at least 600 µmol/mL, based on the total volume of the sorbent, wherein:
the porous support material comprises an organic polymer or a composite material of an organic polymer and an inorganic material,
the porous support material has an average pore size in a range from 10 nm to 300 nm and the pores of the support material are essentially completely filled with the amino group-containing polymer,
the amino group-containing polymer is selected from the group consisting of polyvinylamine, polyallylamine and polylysine,
the amino group-containing polymer is crosslinked with the porous support material and is not covalently linked to the porous support material,
the sorbent is capable of binding a metal from a solution at a pH of ≤5.

* * * * *